(12) United States Patent
Harada et al.

(10) Patent No.: US 7,665,285 B1
(45) Date of Patent: Feb. 23, 2010

(54) WORK VEHICLE HAVING CONVEYANCE MECHANISM WITH BLOWER

(75) Inventors: Eriya Harada, Sakai (JP);
Jean-Christophe Girard, Cher (FR);
Florent Voiry, Meurthe et Moselle (FR)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/372,950

(22) Filed: Feb. 18, 2009

(30) Foreign Application Priority Data

Sep. 18, 2008 (JP) .............................. 2008-239689

(51) Int. Cl.
*A01D 61/00* (2006.01)

(52) U.S. Cl. ...................................................... 56/16.6

(58) Field of Classification Search ................. 56/16.6, 56/202, 28, 30, 203, 10.2 R, 13.3, 194; 460/119
See application file for complete search history.

(56) References Cited

U.S. PATENT DOCUMENTS

| | | | | |
|---|---|---|---|---|
| 4,496,105 A * | 1/1985 | Fleming et al. | ................ | 241/32 |
| 4,527,241 A * | 7/1985 | Sheehan et al. | ................ | 701/50 |
| 4,635,047 A * | 1/1987 | Fox et al. | .................... | 340/684 |
| 4,744,207 A * | 5/1988 | Hanley et al. | ................. | 56/16.6 |
| 5,010,866 A * | 4/1991 | Ohata | .......................... | 123/352 |
| 5,325,650 A * | 7/1994 | Fuse et al. | ................ | 56/10.2 R |
| 5,605,033 A * | 2/1997 | Olmr | ........................ | 56/10.2 R |
| 5,669,212 A * | 9/1997 | Bening et al. | ................. | 56/13.3 |
| 5,832,708 A * | 11/1998 | Sugden | ......................... | 56/202 |
| 5,950,408 A * | 9/1999 | Schaedler | ..................... | 56/202 |
| 6,073,432 A * | 6/2000 | Schaedler | ..................... | 56/202 |
| 6,272,818 B1 | 8/2001 | Sebben et al. | | |
| 7,191,583 B2 * | 3/2007 | Fukushima et al. | ........... | 56/202 |
| 2006/0201123 A1 | 9/2006 | Umemoto et al. | | |

FOREIGN PATENT DOCUMENTS

| | | |
|---|---|---|
| JP | 06153653 | 6/1994 |
| JP | 11168941 | 6/1999 |
| JP | 2008029286 | 2/2008 |

* cited by examiner

*Primary Examiner*—Árpád Fábián-Kovács
(74) *Attorney, Agent, or Firm*—The Webb Law Firm

(57) ABSTRACT

A work vehicle includes: a container; a conveyance mechanism configured to convey an object to the container using a force of wind generated by a blower; and an evaluation unit configured to evaluate a conveyance state of the conveyed object to the container. The evaluation unit has a drive load detecting function of detecting a drive load of the blower, and a conveyance state determining function of determining whether the conveyance state reached a predetermined conveyance state, based on the detected drive load.

7 Claims, 5 Drawing Sheets

WORK VEHICLE HAVING CONVEYANCE MECHANISM WITH BLOWER

BACKGROUND OF THE INVENTION

1. Field of the Invention

The present invention relates to a work vehicle including: a container; a conveyance mechanism configured to convey an object to the container using a force of wind generated by a blower; and an evaluation unit configured to evaluate a conveyance state of the conveyed object in the container.

2. Description of the Related Art

For a work vehicle, such as a front mower and a mid-mount mower, there has been known a mower having a conveyance mechanism for sending grass cut by a mower unit as a conveyed object to a grass-collecting container positioned in a rear portion of a vehicle body, using a force of wind generated by a blower. In addition, there has been also known a work vehicle having a function of evaluating a conveyance state of a conveyed object, such as mown grass, in the container. Specifically, a mower disclosed in Japanese patent application JP11-168941A has a rotating sensor disposed in the vicinity of an opening of a grass-collecting part (grass-collecting container) or an outlet of a duct, and a conveyance state of the mown grass is detected in accordance with the rotation of the rotating sensor, and based on the detected result, a degree of filling of the grass-collecting part is evaluated. A mower disclosed in Japanese patent application JP2008-29286A has a pressure switch disposed in the grass-collecting container, as a full state sensor for detecting that the grass-collecting container is full, and alarm is output when a full state is detected.

In the conventional mowers described above, the sensing body for evaluating a conveyance state of the conveyed object in the container is provided inside the container or in an airflow passage in the vicinity of the container. As a result, there arise problems that a conveyance efficiency of the airflow for conveying the object is reduced due to the presence of the sensing body, and that the sensing body is damaged and a life thereof is shortened due to the continuous contact with the conveyed object.

SUMMARY OF THE INVENTION

The object of the prevent invention is to provide a work vehicle having an evaluation unit which solves the above-described problems in the conventional types of the work vehicle. In the present invention, in order to attain this object, the work vehicle according to the present invention has a conveyance mechanism configured to convey an object to the container using a force of wind generated by a blower; and an evaluation unit configured to evaluate a conveyance state of the conveyed object in the container, and the evaluation unit has a drive load detecting function of detecting a drive load of the blower, and a conveyance state determining function of determining whether the conveyance state reached a predetermined conveyance state, based on the detected drive load.

The drive load of the blower can be detected by: a drive torque of the blower; a driving pressure of a hydraulic motor, in the case where the blower is a hydraulic type blower driven by the hydraulic motor; or a drive current of an electric motor, in the case where the blower is an electric type blower driven by the electric motor. Therefore, it is not necessary that the sensing body for detecting the drive load of the blower, which is an important component of the present invention, be provided in a passage for the conveyed object in the conveyance mechanism. As a result, in the present invention, there can be solved the above-mentioned problems of the prior arts that a conveyance efficiency of the airflow for conveying the object is reduced due to the presence of the sensing body, and that the sensing body is damaged and a life thereof is shortened due to the continuous contact with the conveyed object.

The principle of the present invention will be described in detail below.

During the conveyance of the object by a force of wind generated by the blower, when the conveyed object is accumulated on a downstream side in a conveying direction of the blower, the accumulated conveyed object becomes a conveying load. Accordingly, the conveying air and conveyed object are hindered from flowing to the downstream side in the conveying direction, leading to a fluctuation in the drive load of the blower. The drive load of the blower fluctuates in accordance with an accumulation amount of the conveyed object in the container on the downstream side in the conveying direction of the blower, and the fluctuation is determined based on properties of the blower to be used. In other words, by obtaining in advance a relationship between the accumulation amount of the conveyed object in the container on the downstream side in the conveying direction of the blower and the drive load of the blower based on the properties of the blower used in the conveyance mechanism, a conveyance state of the conveyed object, such as an accumulation amount in the container, can be evaluated from the drive load of the blower detected by some means, in light of the above-mentioned relationship. Other than the accumulation amount in the container, examples of the conveyance state of the conveyed object include a degree of clogging of the conveyance mechanism with the conveyed object.

In a preferred embodiment of the present invention, the work vehicle further includes an annunciation device configured to inform that the conveyed object is in the predetermined conveyance state, in response to the decision of the evaluation unit that the predetermined conveyance state is reached. With this configuration, a predetermined conveyance state of the object conveyed by the conveyance mechanism can be easily and surely informed to a worker by the annunciation device. Accordingly, the worker can appropriately and quickly deal at that moment with the predetermined conveyance state of the object conveyed by the conveyance mechanism.

Two preferable configurations of the conveyance mechanism and the evaluation unit according to the present invention will be specifically stated below. In one embodiment, a rotary drive source of the blower is a hydraulic motor, the evaluation unit is a pressure switch provided in a hydraulic circuit configured to drive the hydraulic motor, and the pressure switch is configured to output a control signal in response to a detection of a predetermined oil pressure value.

In another embodiment, a rotary drive source of the blower is a hydraulic motor, the evaluation unit includes a pressure sensor provided in a hydraulic circuit configured to drive the hydraulic motor and a pressure value-to-conveyed object collected amount determination module connected to the pressure sensor, and the pressure value-to-conveyed object collected amount determination module is configured to determine an amount of the conveyed object collected the container based on an oil pressure value detected by the pressure sensor.

In any of the above-mentioned embodiments, the pressure switch and the pressure sensor as sensing body are disposed in the hydraulic circuit which is located not in association with the passage for the conveyed object in the conveyance mechanism, i.e. totally different location from the passage for the conveyed object, and thus no problems of the prior arts as described above arise. Of course, similar advantages can be obtained, with an embodiment in which an electric motor is used as a rotary drive source of the blower, and a current detector or a voltage detector as sensing body is disposed in the drive circuit.

In a preferred embodiment according to the present invention, there is provided a link mechanism configured to support the container switchably between a receiving position and a discharging position. As described above, based on the detection result of the drive load of the blower, an amount of the conveyed object accumulated in the container can be estimated. According to this configuration, when the amount of the conveyed object accumulated in the container becomes large as a result of the conveyance of the object by the conveyance mechanism, the conveyed object in the container becomes a conveying load, by which the conveying air and conveyed object are hindered from flowing to the container, leading to a fluctuation in the drive load of the blower. Then, the drive load of the blower fluctuates in accordance with an accumulation amount of the conveyed object on the downstream side in a conveying direction of the blower. Accordingly, based on the detected drive load of the blower, an appropriate timing for discharging the conveyed object from the container can be easily found out. With the thus obtained timing, the link mechanism is operated to switch the receiving position of the container to the discharging position, so that the conveyed object in the container can be simply and rapidly discharged outside. In other words, the accumulated object in the container can be effectively discharged.

Furthermore in the present invention, since it is not necessary to install the sensing body for detecting a conveyance state of the conveyed object inside the container or in the vicinity of the container, even when a position (posture) of the container is changed by the above-mentioned link mechanism, wiring or the like that would otherwise extend from the sensing body do not interfere with the container with the changed position. Other features and advantages of the present invention will be apparent from the descriptions of embodiments below, with reference to the attached drawings.

DETAILED DESCRIPTION OF THE PREFERRED EMBODIMENTS

Figure 1:
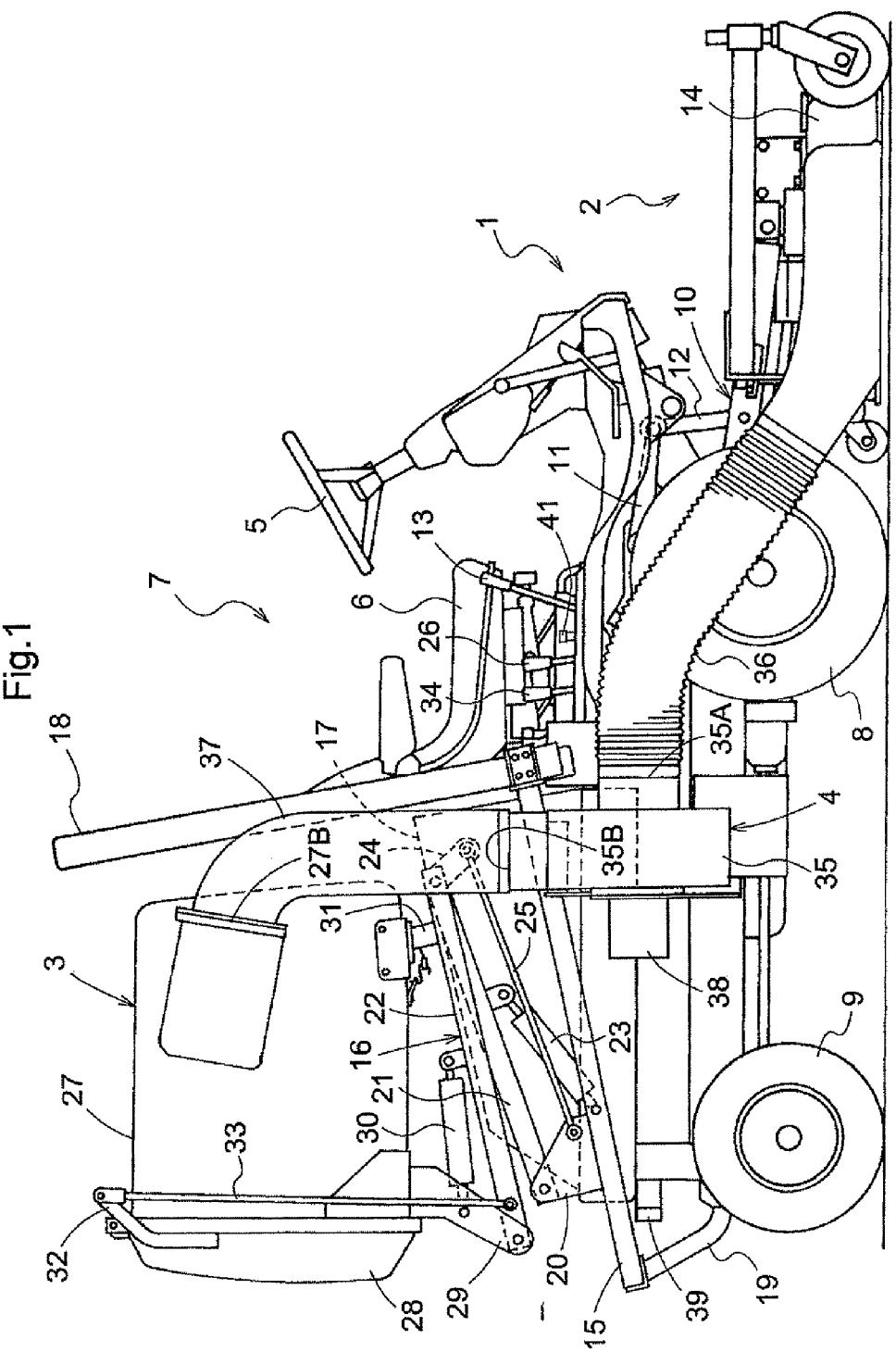
FIG. 1 is an overall right side view of a front mower as an embodiment of a work vehicle of the present invention.

Hereinbelow, in one embodiment of the best modes for carrying out the present invention, a front mower is illustrated as one example of the work vehicle of the present invention, which will be described with reference to the drawings. FIG. 1 is an overall right side view of the front mower, and as shown in this drawing, the front mower includes a mower unit 2 in a front portion of a vehicle body 1, and a grass-collecting container 3 in a rear portion of the vehicle body 1. Grass mown by the mower unit 2 is sent as the conveyed object to the grass-collecting container 3 by a conveyance mechanism 4, and held in the grass-collecting container 3.

The vehicle body 1 has a boarding operation part 7 formed in a front half of the vehicle body 1. In the boarding operation part 7, a steering wheel 5, a driver's seat 6 and the like are mounted. A power from an engine (not shown) mounted on the rear portion of the vehicle body 1 is transmitted to a pair of right and left front wheels 8 and a pair of right and left rear wheels 9. This front mower is a four-wheel drive type, and also a rear wheel steering type, in which the right and left rear wheels 9 are steered by the steering wheel 5.

Though not shown, below the boarding operation part 7 of the vehicle body 1, a hydrostatic transmission (hereinbelow, simply referred to as "HST"), a transmission case (hereinbelow, simply referred to as "T/M case") and the like are disposed. A power from the engine is transmitted to the HST, and through a gear type transmission for traveling provided in the T/M case, a geared power is taken out from an output shaft of the HST, and is transmitted to the right and left front wheels 8 as well as the right and left rear wheels 9. In addition, a non-geared power is taken out from the input shaft of the HST and transmitted to the mower unit 2, through a gear type decelerator, clutch and the like for work, provided in the T/M case.

As shown in FIG. 1, the mower unit 2 is connected movably in a vertical direction to a front portion of the vehicle body 1, through a first link mechanism 10 which is configured to elevate/lower a mower and connected swingably in the vertical direction to a lower portion of the T/M case. The first link mechanism 10 is connected through a linkage link 12 to a pair of right and left lift arms 11 provided swingably in the vertical direction on an upper portion of the T/M case. The right and left lift arms 11 are swingably shift in the vertical direction, due to an actuation of a hydraulic cylinder (not shown) present in the T/M case. The actuation of the hydraulic cylinder can be controlled by operating a first control valve (not shown) for elevating/lowering the mower, provided in the vehicle body 1, and thus by switching a flow of operating oil relative to the hydraulic cylinder. The first control valve is linked through a linkage mechanism (not shown) to a first operating lever 13 disposed on a right side of the driver's seat 6. In other words, by a hydraulic control implemented by operating the first operating lever 13, the mower unit 2 is elevated/lowered, to thereby adjust a height of the mower unit 2 relative to the ground.

It should be noted that, in the present embodiment, the mower unit 2 of a rotary type is illustrated, which has a plurality of blades (not shown) rotatable about respective shafts each vertically oriented in a housing 14. Alternatively, the mower unit of a reel type having a cutting blade rotatable about a shaft laterally oriented may be used.

Figure 2:
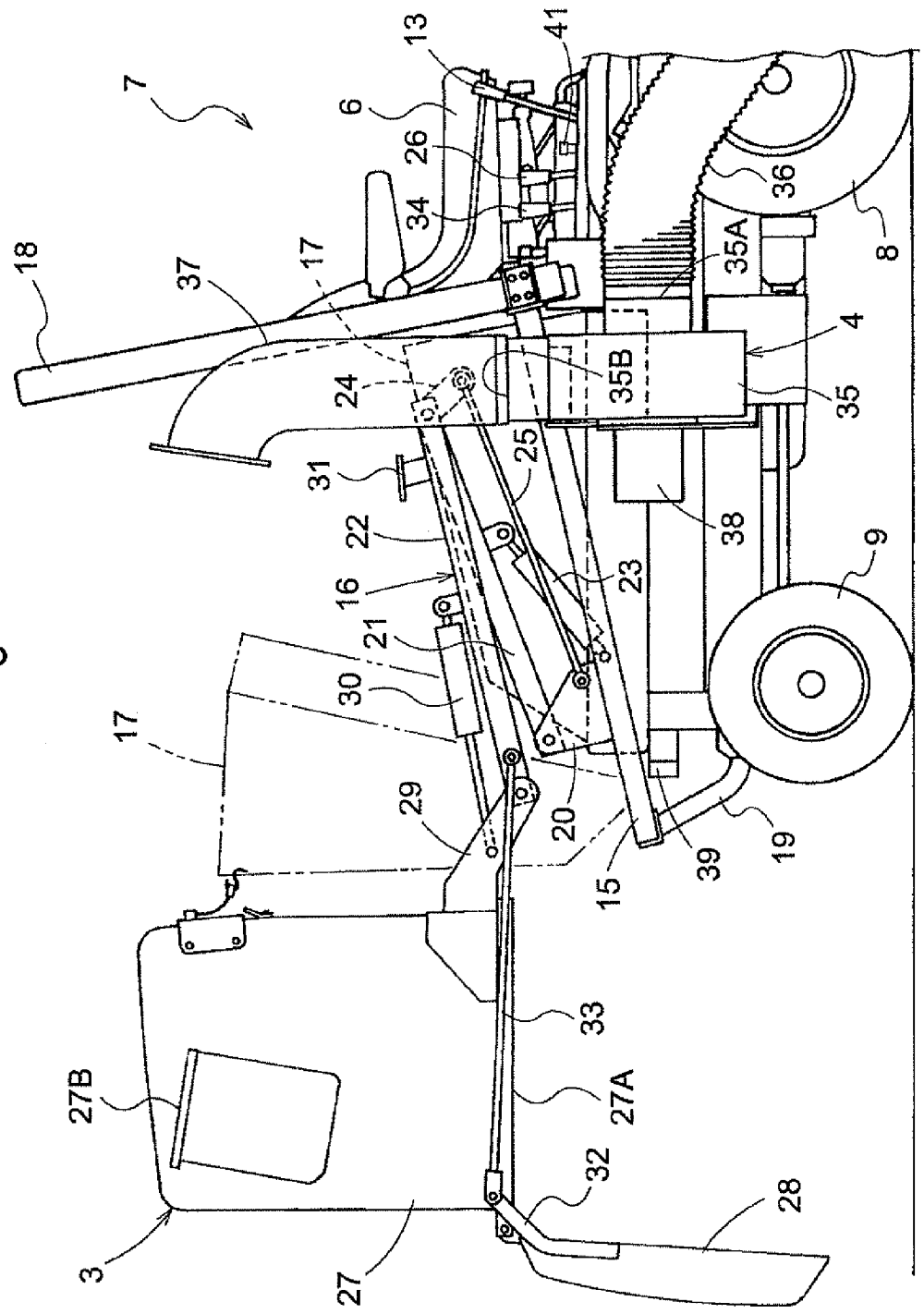
FIG. 2 is a right side view of a relevant part showing a grass-collecting container in a low dump state.
Figure 3:
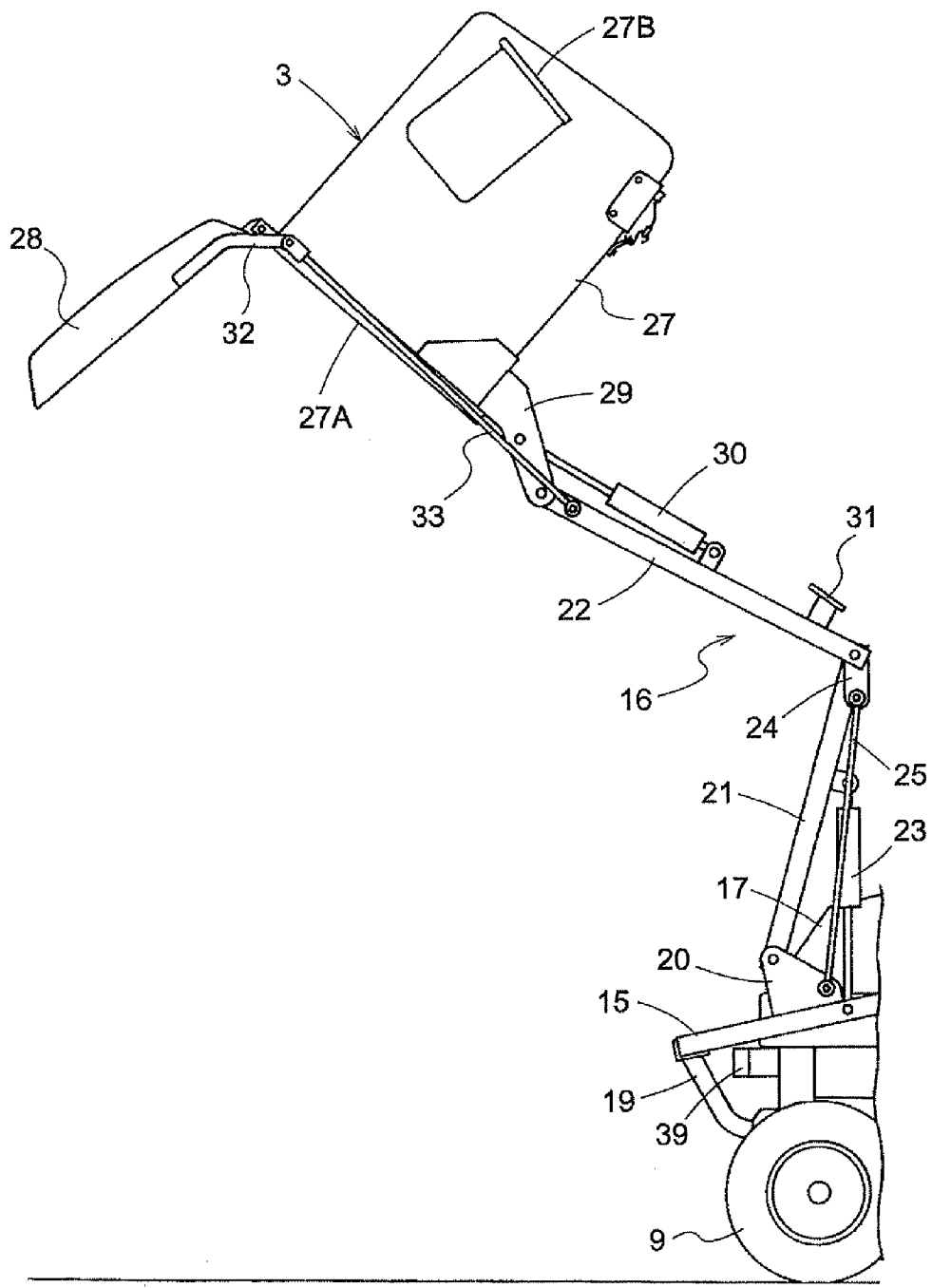
FIG. 3 is a right side view of a relevant part showing a grass-collecting container in a high dump state.

FIG. 2 is a right side view of a relevant part showing the grass-collecting container 3 in a low dump state, and FIG. 3 is a right side view of a relevant part showing the grass-collecting container 3 in a high dump state. As shown in FIGS. 1 to 3, the grass-collecting container 3 is connected to the rear portion of the vehicle body 1 so as to be capable of damping in a swinging manner, through a pair of right and left support frames 15 and a second link mechanism 16 for elevating/lowering the grass-collecting container 3 or the like, disposed on a rear side of the vehicle body 1.

The right and left support frames 15 are installed between an arch-shaped protection frame 18 standing at a middle portion in a front-rear direction of the vehicle body 1 and support arms 19 provided on a rear end portion of the vehicle body 1, in such a manner that they are arranged on both sides of a bonnet 17 covering the engine. In a rear portion of each support frame 15, a bracket 20 stands which facilitates the installation of the second link mechanism 16.

The second link mechanism 16 is composed of, for example: a pair of right and left first links 21 swingably connected to the corresponding right and left brackets 20; and a pair of right and left second links 22 swingably connected to corresponding free ends of the right and left first links 21. The right (left) first link 21 is swung by the actuation of a right (left) first hydraulic cylinder 23 installed between the right (left) support frame 15 and the right (left) first link 21. On an end portion on a swing fulcrum point side, each of the right and left second links 22 has a linkage arm 24 which are swingable uniformly with the corresponding second link. The right (left) linkage arm 24 is connected to the right (left) bracket 20 through a right (left) linkage rod 25, in such a manner that the right (left) second link 22 swingably stands in association with swingably standing motion of the right (left) first link 21, and also, the right (left) second link 22 swingably lies, in association with swingably lying motion of the right (left) first link 21.

The actuation of the right and left first hydraulic cylinders 23 can be controlled by operating a second control valve (not shown) for elevating/lowering the grass-collecting container 3, provided in the vehicle body 1, and thus by switching a flow of operating oil relative to the corresponding hydraulic cylinder 23. The second control valve is linked through a linkage mechanism (not shown) to a second operating lever 26 disposed on the right side of the driver's seat 6.

In other words, by a hydraulic control implemented by operating the second operating lever 26, the second link mechanism 16 is swingably actuated, and with this swingable actuation, the height position of the grass-collecting container 3 can be switched between a low dump position where the grass-collecting container 3 is directly above the bonnet 17, and a high dump position where the grass-collecting container 3 is positioned rearward and upward of the bonnet 17.

The grass-collecting container 3 includes: a container main body 27 having porous air vent portions (not shown) for flowing air for conveying mown grass introduced into the grass-collecting container 3 to outside; and a swingable lid 28 which opens and closes a discharge port 27A formed in the container main body 27.

The container main body 27 is connected to free ends of the right and left second links 22 through a pair of corresponding right and left brackets 29 provided on an end portion of the discharge port side of the container main body 27, in such a manner that a swing operation about a shaft in a lateral direction as a fulcrum point can be carried out. By actuating a pair of right and left second hydraulic cylinders 30 installed between the right second link 22 and the right bracket 29, and the left second link 22 and the left bracket 29, respectively, the container main body 27 is swingably displaced between a receiving position in which the discharge port 27A is oriented rearward of the vehicle and a discharging position in which the discharge port 27A is oriented to the ground. In addition, in the receiving position, a front end portion of the container main body 27 is received and supported by support members 31 uniformly installed to the corresponding second links 22.

The lid 28 has a pair of right and left linkage arms 32 which are attached to an end portion of the lid 28 on a swing fulcrum point side in a uniformly swingable manner. The right and left linkage arms 32 are connected to the right and left second links 22 through a pair of right and left linkage rods 33, respectively, in such a manner that, in association with the swinging displacement of the container main body 27 from a receiving position to a discharging position, the lid 28 is swingably displaced from a close position in which the discharge port 27A of the container main body 27 is closed to an open position in which the discharge port 27A is opened, and also, in association with the swinging displacement of the container main body 27 from the discharging position to the receiving position, the lid 28 is swingably displaced from the open position in which the discharge port 27A is opened to the close position in which the discharge port 27A is closed.

The actuation of the right and left second hydraulic cylinders 30 can be controlled by operating a third control valve (not shown) for switching collection and discharge, provided in the vehicle body 1, and thus by switching a flow of operating oil relative to the corresponding cylinder. The third control valve is linked through a linkage mechanism (not shown) to a third operating lever 34 disposed on the right side of the driver's seat 6.

In other words, by a hydraulic control implemented by operating the third operating lever 34, the grass-collecting container 3 is switched between a grass collection state in which the container 3 holds mown grass therein, and a low dump state in which mown grass held therein is discharged outside in a low dump position. In addition, by a hydraulic control implemented by operating the second operating lever 26 and the third operating lever 34, the grass-collecting container 3 is switched between the grass collection state in which the container 3 holds mown grass therein, and a high dump state in which mown grass held therein is discharged outside in a high dump position.

The conveyance mechanism 4 includes: a centrifugal type blower 35 provided on a right side portion of the vehicle body 1; a first duct 36 (which is one example of a guide pipe) connecting a discharge port (not shown) formed on a right end portion of the housing 14 of the mower unit 2 and a suction inlet 35A of the blower 35; a second duct 37 (which is one example of a guide pipe) connecting a discharge port 35B of the blower 35 and a receiving inlet 27B formed in the container main body 27 of the grass-collecting container 3; and the like.

The blower 35 is a hydraulic type blower driven by a hydraulic motor 38, and with the operation of the motor 38, sucks grass cut by the mower unit 2 together with ambient air through the first duct 36, and discharge the sucked mown grass and ambient air to the grass-collecting container 3 through the second duct 37. The first duct 36 is configured to guide the mown grass and ambient air sucked by the blower 35 from the discharge port of the mower unit 2 to the suction inlet 35A of the blower 35. The second duct 37 is configured to guide the mown grass and ambient air discharged by the blower 35, from the discharge port 35B of the blower 35 to the receiving inlet 27B of the grass-collecting container 3.

Figure 4:
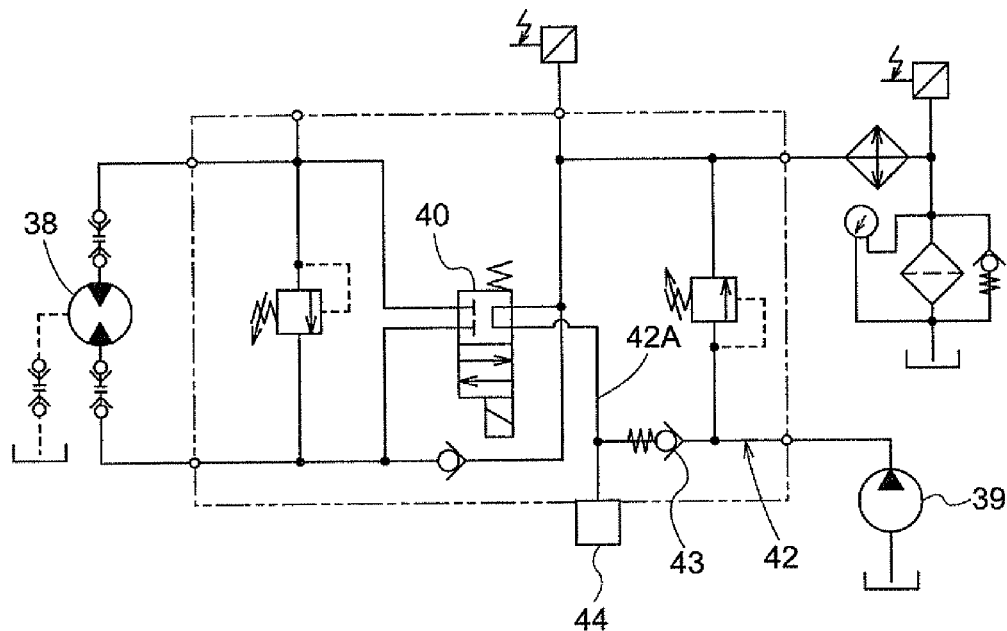
FIG. 4 is a hydraulic circuit diagram showing a structure of a hydraulic circuit for driving a blower.

FIG. 4 is a hydraulic circuit diagram showing a structure of a hydraulic circuit for driving the blower 35, and as shown in this drawing, the hydraulic circuit is composed of: a hydraulic pump 39 configured to be driven by the engine; an electromagnetic control valve 40 configured to switch a flow of operating oil pumped by the hydraulic pump 39; and the like.

As shown in FIGS. 1 to 4, the control valve 40 is switched between a circulation state in which operating oil from the hydraulic pump 39 is circulated to the hydraulic motor 38, and a rest state in which the circulation is stopped, in accordance with an operation of an alternate switch 41 disposed on the right side of the driver's seat 6. The hydraulic motor 38 is configured to be actuated by the initiation of an operating oil circulation which in turn drives the blower 35, and to be stopped by a termination of the operating oil circulation which in turn stops the blower 35.

In other words, grass cut by the mower unit 2 can be sent to the grass-collecting container 3 where the mown grass is held, by switching a state of the alternate switch 41 from an off-state (non-energized state) to an on-state (energized state) to thereby drive the blower 35, during an initiation of a mowing operation; or by using the action of the blower 35, during the mowing operation. In addition, when the mowing operation is paused or finished, by switching a state of the alternate switch 41 from the on-state to the off-state and thus by stopping the blower 35, collection of grass utilizing the action of the blower 35 can be terminated.

In this embodiment, as shown in FIGS. 1 to 3, in order to simplify a driving structure, the hydraulic pump 39 is disposed at the rear end portion of the vehicle body 1 so as to abut an engine mounted in the rear portion of the vehicle body 1.

It has been known that as one property of the centrifugal type blower 35, a drive load becomes higher as an air volume becomes larger, and the drive load becomes lower as the air volume becomes smaller. Therefore, in the work vehicle in which grass is collected in the grass-collecting container 3 by the action of the blower 35, air is more likely to flow towards the grass-collecting container 3 for a smaller amount of the collected grass in the grass-collecting container 3, leading to a larger air volume of the blower 35, with which the drive load of the blower 35 becomes higher. In contrast, air is more hindered from flowing towards the grass-collecting container 3 for a larger amount of the collected grass in the grass-collecting container 3, leading to a smaller air volume of the blower 35, with which the drive load of the blower 35 becomes lower. When the blower 35 is a hydraulic type blower, such a drive load of the blower 35 can be detected based on a driving pressure of the hydraulic motor 38 for driving the blower 35.

In other words, in the case of the front mower illustrated in the present embodiment, by monitoring the driving pressure of the hydraulic motor 38 in the hydraulic circuit for driving the blower 35, the collected grass amount in the grass-collecting container 3 can be obtained.

Figure 5:
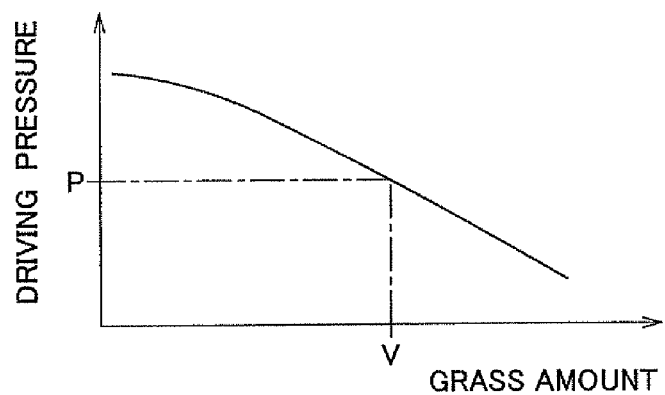
FIG. 5 is a graph showing a relationship between collected grass amount in the grass-collecting container and driving pressure (hydraulic pressure) of a hydraulic motor.

FIG. 5 is a graph showing a relationship between collected grass amount in the grass-collecting container 3 and driving pressure of the hydraulic motor 38, and as is apparent from this graph, when the collected grass amount in the grass-collecting container 3 reached a set amount V, it is found that the driving pressure of the hydraulic motor 38 reached a predetermined value P which corresponds to the collected grass amount A.

Accordingly, as shown in FIG. 4, in this front mower, among from portions of a supply oil passage 42 extending from the hydraulic pump 39 to the hydraulic motor 38 of the hydraulic circuits an oil passage portion 42A positioned between the control valve 40 and a check valve 43 is equipped with an evaluation unit 44 configured to detect and evaluate the hydraulic pressure of the oil passage portion 42A as a driving pressure of the hydraulic motor 38. In the present embodiment, a pressure switch is adopted as the evaluation unit 44, which is configured to become an off-state (non-energized state) when the hydraulic pressure of the oil passage portion 42A is larger than a predetermined value obtained in the case where the collected grass amount in the grass-collecting container 3 reached a full state, and to become an on-state (energized state) when it is equivalent to the predetermined value or less.

Figure 6:
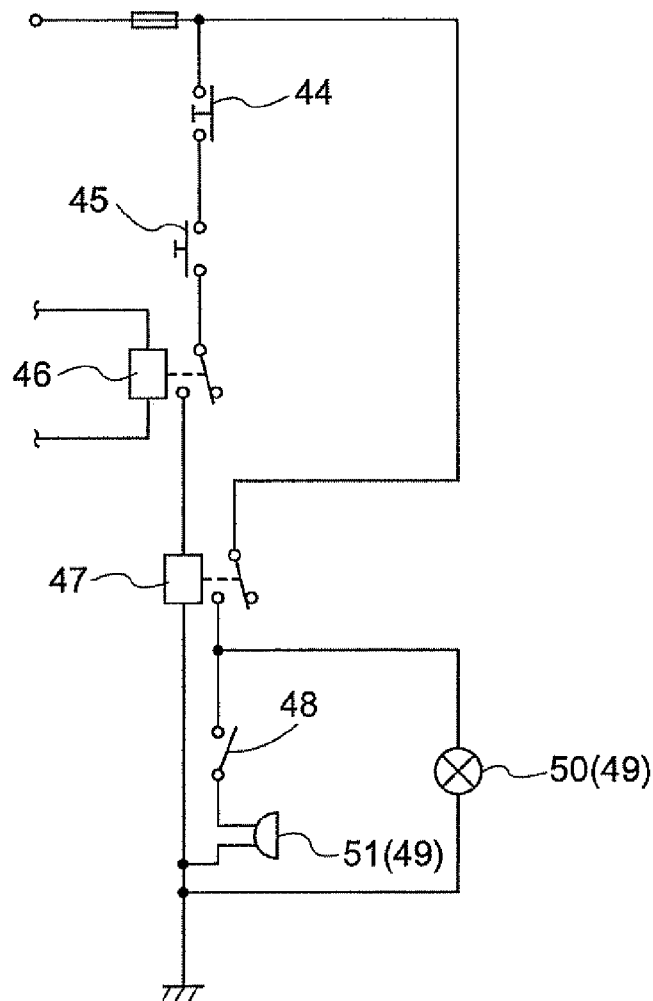
FIG. 6 is a circuit diagram showing a structure of a full state annunciation circuit for informing that the grass-collecting container is full.

FIG. 6 is a circuit diagram showing a structure of a full state annunciation circuit for informing a full state of the grass-collecting container 3, and as shown in this drawing, the full state annunciation circuit includes: a pressure switch 52; an acceleration switch 45; a first relay switch 46; a second relay switch 47; a buzzer switch 48; an indicator light 50 with a buzzer 51 as a annunciation device 49; and the like.

Though not shown, the acceleration switch 45 is configured to become an on-state (energized state) when an operation position of an acceleration setting device (not shown) mounted on the vehicle body 1 is within a set region for operation, and to become an off-state (non-energized state) when it is outside the set region for operation.

The first relay switch 46 is configured to become an on-state (energized state) when both of the key switch and the alternate switch 41 (see FIGS. 1 to 3) provided on the vehicle body 1 are in on-state, and to become an off-state (non-energized state) in other cases.

The second relay switch 47 is configured to become an on-state (energized state) when all of the pressure switch 52, the acceleration switch 45 and the first relay switch 46 are in on-state, and to become an off-state (non-energized state) in other cases.

The buzzer switch 48 is configured to switch, by manual operation, between an on-state in which conduction to the buzzer 51 is permitted, and an off-state in which conduction to the buzzer 51 is cut off. In other words, by operating the buzzer switch 48, selection is made between whether or not the buzzer 51 is used.

The indicator light 50 is configured to light up when the second relay switch 47 is in an on-state in which conduction to the indicator light 50 is permitted, and to go out when the second relay switch 47 is in an off-state in which conduction is cut off.

The buzzer 51 is configured to be activated when both of the second relay switch 47 and the buzzer switch 48 are in on-state to permit conduction to the buzzer 51, and to deactivate in other cases.

In other words, under a mowing operation condition where the key switch is turned on, the acceleration setting device is operated within the set region for working, and the alternate switch 41 is switched to an on-state, when the grass-collecting container 3 becomes full, the full state annunciation circuit informs of the full state of the grass-collecting container 3, by lighting the indicator light 50 in the case where a use of the buzzer 51 is not selected, or by lighting the indicator light 50 and activating the buzzer 51 in the case where a use of the buzzer 51 is selected.

In addition, in accordance with this annunciation, by pausing the mowing operation and moving the work vehicle to a predetermined mown grass discharge location, and then by discharging the collected mown grass while swinging the grass-collecting container 3, the mown grass is prevented from being accumulated inside of the second duct 37 and blower 35. As a result, the mowing operation can be resumed without any labors of removing mown grass which may otherwise be accumulated inside of the second duct 37 and blower 35.

Moreover, with the pressure switch 52 as an evaluation unit incorporated into the hydraulic circuit for driving the blower 35, the full state of the grass-collecting container 3 can be detected, which eliminates the necessity of installing the sensing body for detecting the full state of the grass-collecting container 3, inside of the grass-collecting container 3, inside of the second duct 26 or the like.

Modified Embodiment (1) For the work vehicle, any work vehicle can be used, as long as it has the conveyance mechanism 4 configured to convey an object, such as mown grass, using the action of the blower 35, and examples include a mid-mount mower in which the mower unit 2 is mounted between a pair of right and left front wheels 8 and a pair of right and left rear wheels 9 in the vehicle body 1; a zero turn mower in which the mower unit 2 is mounted between a pair of right and left caster type front wheels and a pair of right and left rear wheels capable of being independently driven in the vehicle body 1; a reel mower with a reel type mower unit; and a sweeper specialized for collecting grass.

Alternatively, the work vehicle may be a rice transplanter or a tractor having a fertilizing device with a conveyance mechanism 4 configured to convey an object such as fertilizer and agent, from a reservoir to an agricultural field using the action of the blower 35. In this case, based on the drive load of the blower 35 detected and evaluated by the evaluation unit 44, a degree of clogging of the conveyance mechanism 4 with the conveyed object can be detected.

(2) For the conveyance mechanism 4, there may be used one configured to convey an object utilizing the action of the blower 35 of an axial flow type. It should be noted that, in the case where the blower 35 is an axial flow type blower, when the conveyed object begins to accumulate on a downstream side in a conveying direction of the blower 35, the accumulated object becomes a conveying load, which makes the drive load of the blower 35 larger.

(3) Alternatively, the blower 35 may be an electric type blower driven by an electric motor, or one driven by a power from an engine.

Figure 7:
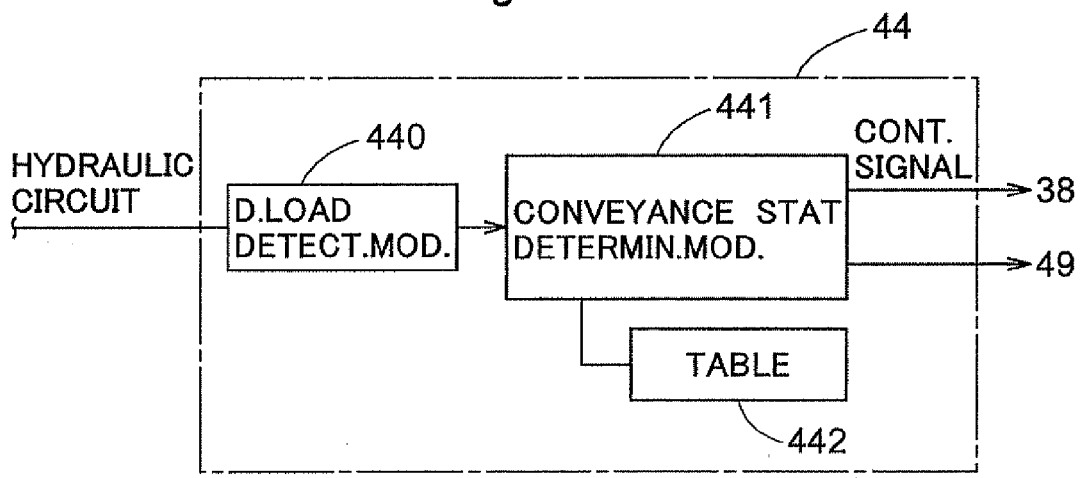
FIG. 7 is a schematic diagram showing another embodiment of the evaluation unit.

(4) For the sensing body of the evaluation unit 44, there may be used: a torque sensor configured to detect a drive torque of the blower 35; a pressure sensor (pressure gauge) configured to detect a driving pressure of the hydraulic motor 38 in the case where the blower 35 is a hydraulic type blower driven by the hydraulic motor 38; or an ammeter configured to detect a drive current of an electric motor in the case where the blower 35 is an electric type blower driven by the electric motor. FIG. 7 shows a preferable evaluation unit 44, in the case where the pressure sensor or ammeter, which continuously detects the drive load value, is adopted as the sensing body for detecting the drive load of the blower 35. The evaluation unit 44 shown in FIG. 7 includes: a drive load detecting module 440, such as a pressure sensor and an ammeter; a conveyance state determination module 441, such as a microcomputer or a logic calculation unit, configured to determine whether or not the conveyance state of the conveyed object (mown grass) reached a predetermined conveyance state, based on the drive load; and an evaluation table 442 showing a relationship between drive load and conveyance state. In response to the conveyance state determined by the conveyance state determination module 441, a control signal is sent to the hydraulic motor 38 (or electric motor) and the annunciation device 49.

(5) The annunciation device 49 may be a display informing with letters or a voice generator informing with voice, of the conveyance state of the object conveyed by the conveyance mechanism 4, which state is detected and evaluated by the evaluation unit 44, or may be a display informing with graphs of a transition of the conveyance state (e.g., collected grass amount) of the object conveyed by the conveyance mechanism 4, which state is detected and evaluated by the evaluation unit 44.

(6) Optionally, a control circuit for informing the full state may be provided, which is configured to activate the annunciation device 49 when the evaluation value by the evaluation unit 44 exceeds a threshold for the full state.

(7) Optionally, a control circuit for informing clogging may be provided, which is configured to activate the annunciation device 49 when the detection value by the detection unit 44 exceeds the threshold for clogging.

(8) Alternatively, the annunciation device 49 may be activated and at the same time the blower 35 may be automatically stopped, when the evaluation value by the evaluation unit 44 exceeds a threshold for the full state or threshold for clogging, and optionally the mower unit 2, in addition to the blower 35, may be automatically stopped.

What is claimed is:

1. A work vehicle comprising:
   a container;
   a conveyance mechanism configured to convey an object to the container using a force of wind generated by a blower; and
   an evaluation unit configured to evaluate a conveyance state of the conveyed object in the container,
   the evaluation unit having a drive load detecting function of detecting a drive load of the blower, and a conveyance state determining function of determining whether the conveyance state reached a predetermined conveyance state, based on the detected drive load.

2. The work vehicle according to claim 1, further comprising:
   an annunciation device configured to inform that the conveyed object is in the predetermined conveyance state, in response to the decision of the evaluation unit that the predetermined conveyance state is reached.

3. The work vehicle according to claim 1, wherein
   a rotary drive source of the blower is a hydraulic motor,
   the evaluation unit is a pressure switch provided in a hydraulic circuit configured to drive the hydraulic motor, and
   the pressure switch is configured to output a control signal in response to a detection of a predetermined oil pressure value.

4. The work vehicle according to claim 1, wherein
   a rotary drive source of the blower is a hydraulic motor,
   the evaluation unit comprises: a pressure sensor provided in a hydraulic circuit configured to drive the hydraulic motor; and a pressure value-to-conveyed object collected amount determination module connected to the pressure sensor, and
   the pressure value-to-conveyed object collected amount determination module is configured to determine an amount of the conveyed object collected in the container based on an oil pressure value detected by the pressure sensor.

5. The work vehicle according to claim 1, further comprises a mower unit configured to cut grass from the ground,
   wherein grass mown by the mower unit is sent as the conveyed object to a grass-collecting container as the container by the conveyance mechanism.

6. The work vehicle according to claim 5, wherein the predetermined conveyance state is a full state of the mown grass in the grass-collecting container.

7. The work vehicle according to claim 1, further comprising a link mechanism configured to support the container switchably between a receiving position and a discharging position.

* * * * *